(12) United States Patent
Clark et al.

(10) Patent No.: US 7,237,119 B2
(45) Date of Patent: Jun. 26, 2007

(54) METHOD, SYSTEM AND COMPUTER PROGRAM FOR MANAGING USER AUTHORIZATION LEVELS

(75) Inventors: David W. Clark, Marietta, GA (US); Marcee A. Burns, Marietta, GA (US); James F. Mathis, Lawrenceville, GA (US); Danny R. Ashley, Marietta, GA (US); Jeff S. Jacobs, Roswell, GA (US); Trent A. Hinkel, Atlanta, GA (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 714 days.

(21) Appl. No.: 10/611,436

(22) Filed: Jun. 30, 2003

(65) Prior Publication Data

US 2004/0268125 A1    Dec. 30, 2004

(51) Int. Cl.
*G06F 9/00* (2006.01)
(52) U.S. Cl. ............... 713/182; 713/189; 713/193

(58) Field of Classification Search ............... 713/182, 713/189, 193
See application file for complete search history.

(56) References Cited

U.S. PATENT DOCUMENTS 5,261,102 A * 11/1993 Hoffman ................. 726/19
6,014,666 A * 1/2000 Helland et al. ........... 707/9

FOREIGN PATENT DOCUMENTS

WO    PCT/US98/09206    11/1998

* cited by examiner

*Primary Examiner*—Thomas R. Peeso
(74) *Attorney, Agent, or Firm*—Cantor Colburn LLP

(57) ABSTRACT

An embodiment of the invention is a method of managing user authorization levels for access to a plurality of applications. The method includes receiving a request from a user to establish a user profile and establishing an employment indicator for the user. A user authorization level template is obtained in response to the employment indicator. The user authorization level template identifies a plurality of applications and a user authorization level for each application. The user authorization levels are then associated with the user.

24 Claims, 7 Drawing Sheets

*FIG. 3*

| APPLICATION USER ROLE / DSX CTRL | JOB TITLE | CCM | TEO Prep Contractor | NRC Database Administrator | OSP ENGR | OSPE Contractor | DLEC | LCM | OSP Area Manager | PM Tool Coord | Network Technical Manager | Resource Manager | Construction Supervisor | Electronic Technician | SCM Switching Capacity Mana | Broadband Planner | EOCS |
|---|---|---|---|---|---|---|---|---|---|---|---|---|---|---|---|---|---|
| DSX/FOX | | | | | | | | | | | | | | | | | |
| USER ROLE | | | | | | | | | | | | | | | | | |
| READ ONLY | | | | X | | | | | | | | | | X | X | | |
| READ WRITE | | X | X | | X | X | | | | | | | | | | X | |
| | | | | | | | | | | | | | | | | | |
| CCMEIU | | | | | | | | | | | | | | | | | |
| USER ROLE | | | | | | | | | | | | | | | | | |
| EOCS | | | | | | | | | | | | | | | | | X |
| ADMIN | | X | | | | | | | | | | X | | X | | | X |
| VENDOR | | | X | | | | | | | | | | | | | | |
| PLANNER | | X | | | | | | | | | | | | | X | X | X |
| | | | | | | | | | | | | | | | | | |
| PM Tool | | | | | | | | | | | | | | | | | |
| USER GROUP | | | | | | | | | | | | | | | | | |
| MAINT | | | | | | | | | | X | X | | | | | | |
| NOMAINT | | | | | X | X | X | X | X | | | X | X | | | | |

USER PROFILE JOB TITLE TEMPLATE — 150

METHOD, SYSTEM AND COMPUTER PROGRAM FOR MANAGING USER AUTHORIZATION LEVELS

BACKGROUND OF THE INVENTION

The present invention relates generally to managing user authorization levels.

Many software applications employ user authorization levels to control items such as user access and user permission levels for those applications. While helpful in preventing unauthorized access, such systems have a number of drawbacks. For a large application user base, the administrator(s) of those application(s) can be overwhelmed by numerous requests to add new users and/or to change the authorization levels of existing users of the applications(s). Additionally, if the user base extends to different work groups or even different cities from where the application administrator(s) are located, there are security issues where the administrator(s) must validate that the user is indeed an employee requiring application access and in many cases, the application administrator(s) will not know when to disable a user's access when the user is no longer employed by the company or they change to a different job within the company that does not require access to the application(s). Also, another security issue is the validation of permission levels for users in other work groups or cities where those users are not personally known by the application administrator(s).

Some application users require authorization levels for accessing multiple software applications (in a suite of applications) with the correct permission levels for each application. Enabling authorization levels (e.g., user access and permission) for multiple software applications can be a time-consuming process for an application administrator to handle even for a single user.

A new user may take over the job of an existing application user (i.e., the existing user has retired and a new person takes their job). This requires a time consuming amount of work for the application administrator(s) to duplicate the exact same application access and permission levels for the new user to match the access and permission levels of the outgoing user. If users need access to multiple software applications (in a suite of applications) with the correct permission levels for each application, then a problem exists in providing consistent standardized access and permission levels based on work group or job title. In addition, if the application access was created on an individual application basis, and one or more required applications were forgotten on the initial set-up of a user, then the user and application manager would have to go through the process of setting up access and permissions for those application(s) at a later time.

An additional problem for large application user groups is that certain types of users (company, contractor, application provider, etc.) may require certain restrictions or permissions based on their user type. An example is that a company user may need access to all application database records with no restrictions placed on viewing these records. However, a contractor user may need to have restrictions placed to protect proprietary information (such as pricing or another contractor's information) within the application databases. In addition, the application provider may need full administrative rights in order to maintain the application(s).

Many large companies have applications that require user IDs and passwords for security reasons. Application databases may require the current employee information must be entered in the application database prior to granting access to an application. This can be a time-consuming process to type employee information in the application database.

Existing systems attempt to manage employee authorization levels by establishing user profiles. The user profiles are used to define permissions such as read, write and execute permission. Permissions may be defined for an individual or for a group. Creation and management of these user profiles, however, requires significant involvement from an administrator.

SUMMARY OF THE INVENTION

An embodiment of the invention is a method of managing user authorization levels for access to a plurality of applications. The method includes receiving a request from a user to establish a user profile and establishing an employment indicator for the user. A user authorization level template is obtained in response to the employment indicator. The user authorization level template identifies a plurality of applications and a user authorization level for each application. The user authorization levels are then associated with the user.

BRIEF DESCRIPTION OF THE DRAWINGS

Referring to the exemplary drawings wherein like elements are numbered alike in the accompanying Figures:

FIGS. 3–5 depict exemplary user interfaces for managing user authorization levels;

FIG. 6 depicts an exemplary user authorization level template database;

DETAILED DESCRIPTION OF THE INVENTION

Figure 1:
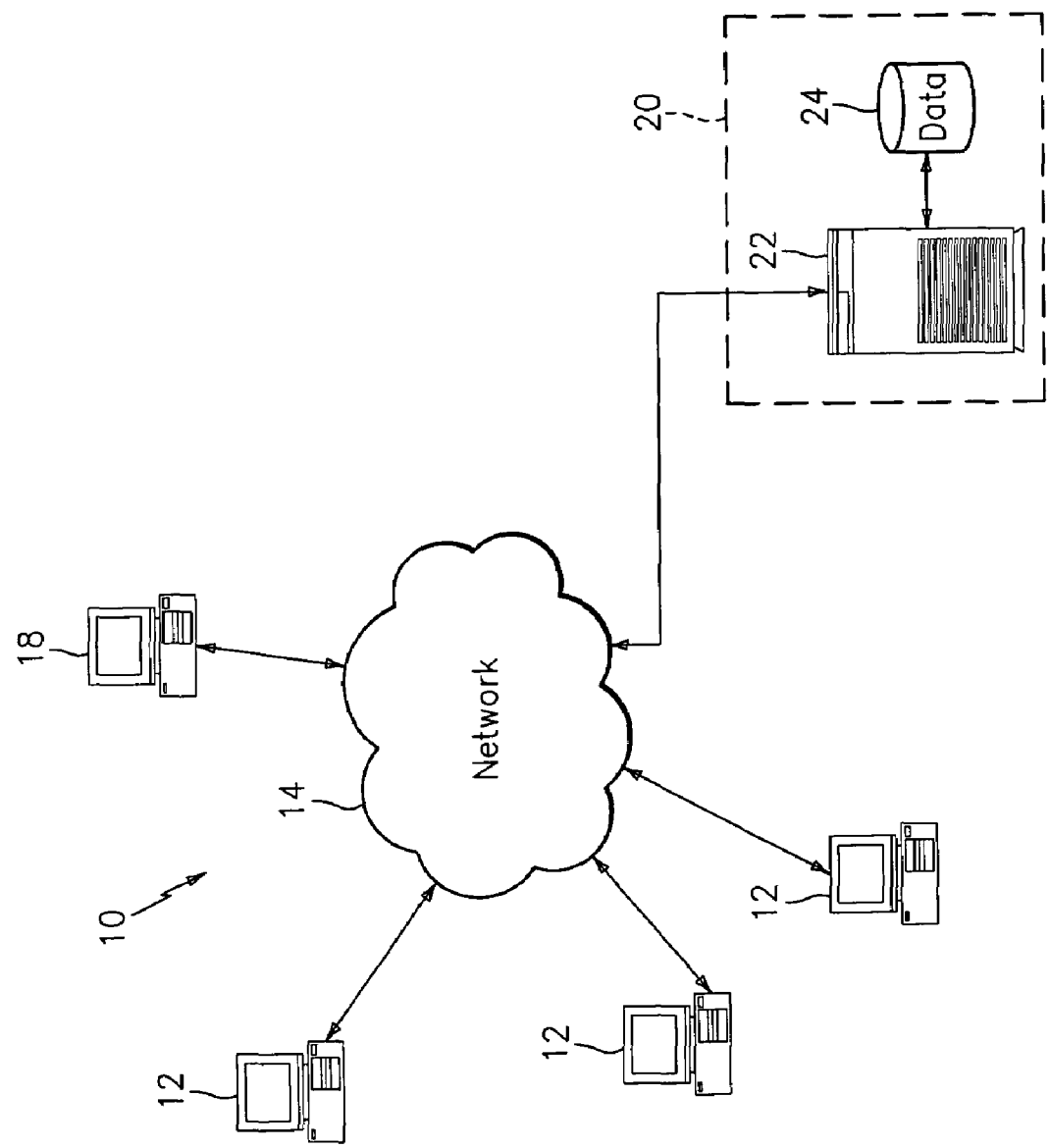
FIG. 1 is a block diagram of an exemplary system for implementing the invention.

FIG. 1 is a block diagram of an exemplary system 10 for managing user authorization levels to control access to applications and permissions within applications. Access refers to a user's ability to execute an application. Permissions refers to a user's abilities within an application (read, write, etc.). User authorization levels may include access and permission levels, along with other security indicators.

System 10 includes a number of user terminals 12 operated by users desiring access to applications. The user systems 12 may be implemented using general-purpose computers executing a computer program for carrying out the processes described herein. Alternatively, user systems 12 may be implemented using devices programmed primarily for accessing network 14 such as a dumb terminal. Further, the user systems 12 may be portable devices such as PDAs, cell phones, etc. User systems 12 are coupled to network 14 which may be any type of known network including a local area network (LAN), wide area network (WAN), global network (e.g., Internet), intranet, virtual private network (VPN), etc. User systems 12 may be physically located in geographically disperse locations. A user at user system 12 may act as an administrator depending on the user's authorization level, described in further detail herein.

The user systems 12 are coupled to an applications system 20 including a server 22 and a database 24. Database 24 may be a part of server 22, a separate device, or a collection of multiple devices accessible by server 22. The user systems 12 may be coupled to the applications system 20 through multiple networks (e.g., intranet and Internet) so that not all user systems 12 are coupled to the applications system 20 by the same network. One or all of the user systems 12 and applications system 20 may be connected to the network 14 in a wireless fashion and network 14 may be a wireless network.

In operation, an administrator at administrator system 18 is responsible for establishing a user profile for each user that may access server 22 and request access to an application. To facilitate managing user authorization levels, the administrator system 18 has access to a plurality of user authorization level templates on database 24. Further, human resource information on database 24 facilitates establishing or editing user authorization levels.

Figure 2:
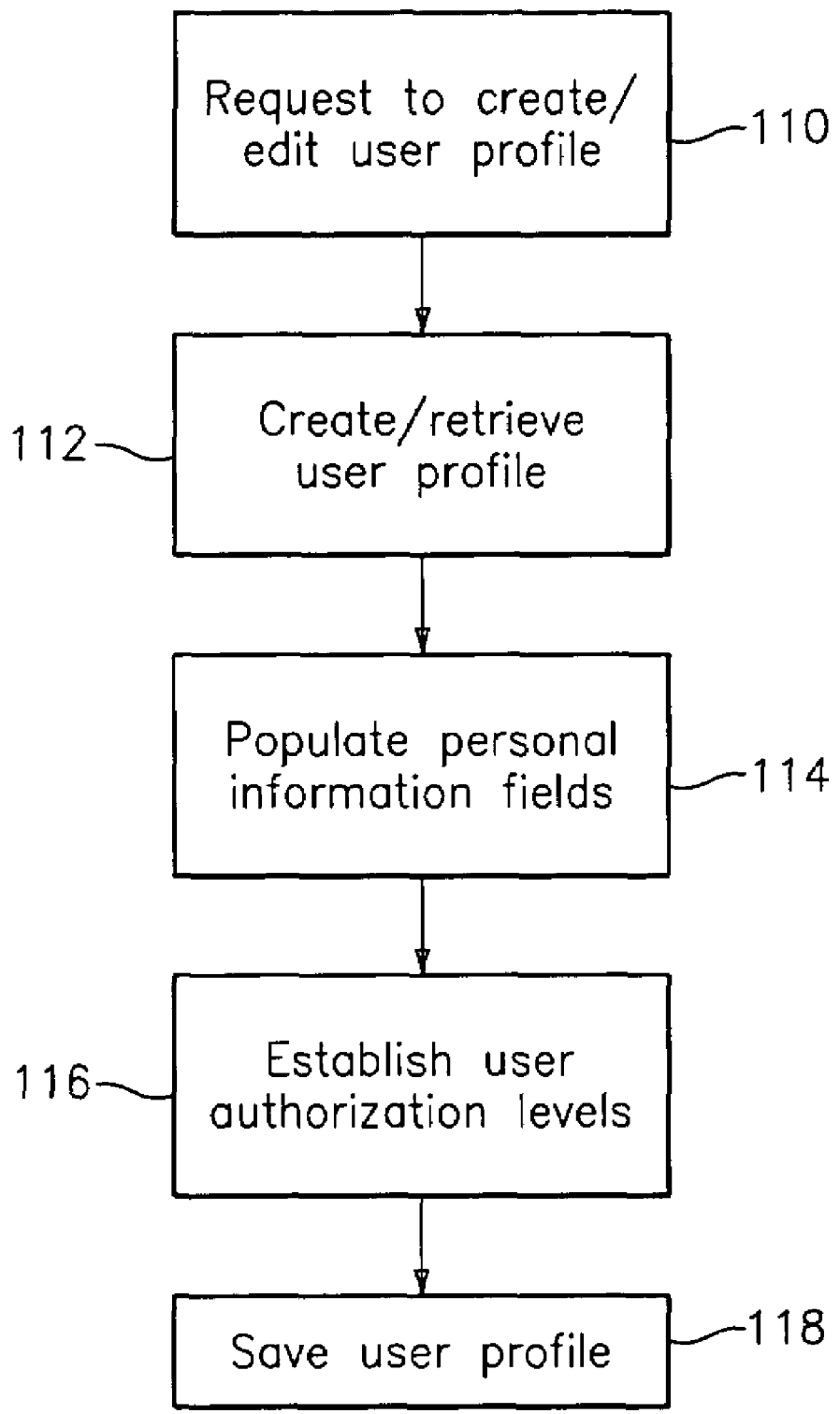
FIG. 2 is a flowchart of an exemplary process for creating or editing a user profile.

FIG. 2 is a flowchart of an exemplary process for creating or editing a user profile which utilizes user authorization level templates. The process begins at step 110 where there is a need to create or edit a user profile. This may be initiated for a variety of reasons such as a new user requesting a new profile or an existing user requesting a change in their user profile. The request is submitted to an administrator operating administrator system 18.

Figure 3:
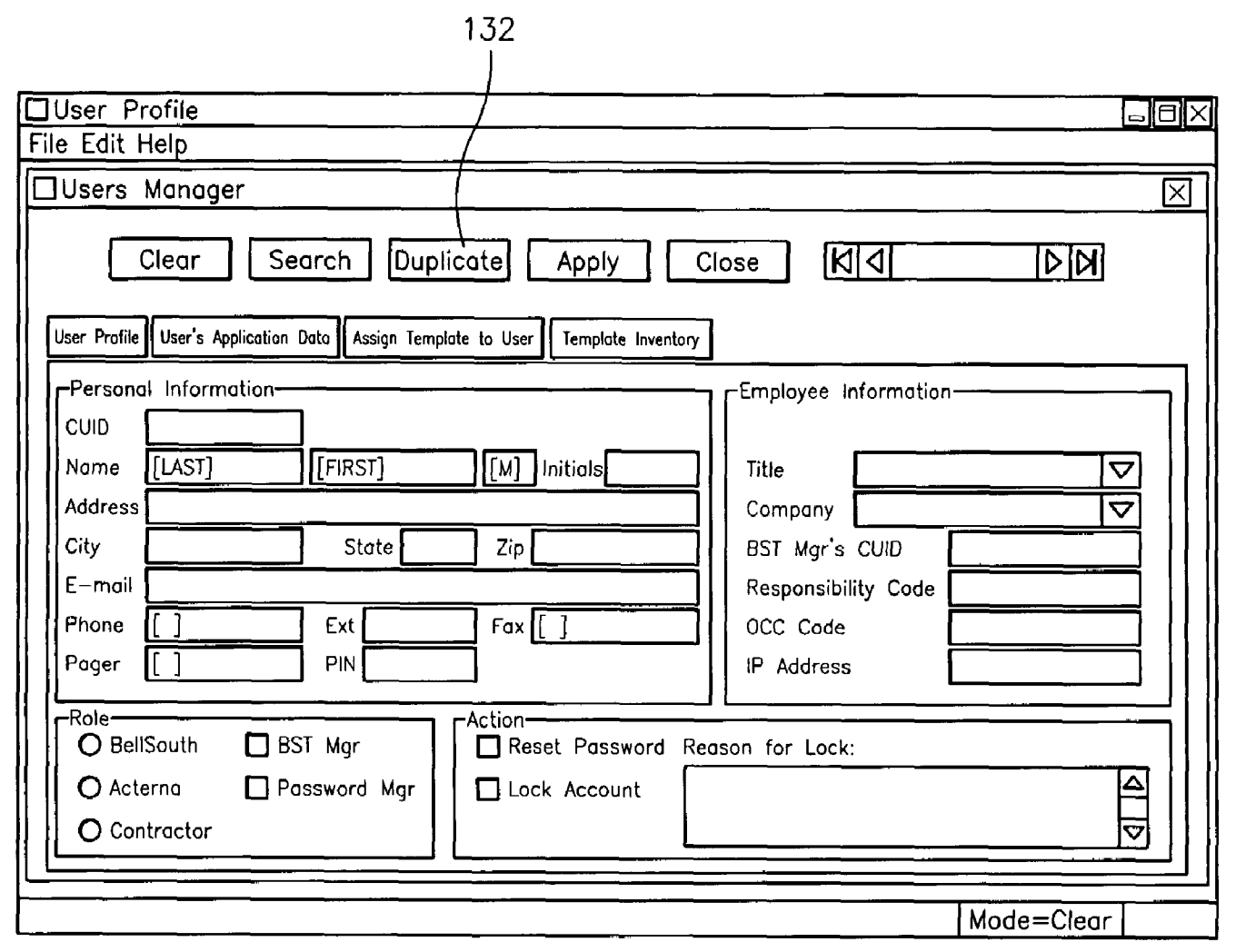

The administrator then either creates a new user profile or accesses an existing user profile from database 24 at step 112. FIG. 3 depicts an exemplary user interface for creating a user profile and in particular shows fields for entering personal information. Server 22 executes a user profile management software application that provides the functions disclosed herein, along with the user interfaces. If the administrator is editing a user profile, the fields would be completed. The user interface includes fields for a variety of information such as user identifier (CUID), name, address, etc.

In one embodiment of the invention, the personal information fields in the user profile may be populated using an auxiliary database as shown at step 114. In this embodiment, the user information is retrieved from another database (e.g., a human resources database) to complete fields in the user profile. This auxiliary data may be stored on database 24 and then imported into the user interface shown in FIG. 3. If such information is not available, then the administrator enters the personal information manually.

Figure 4:
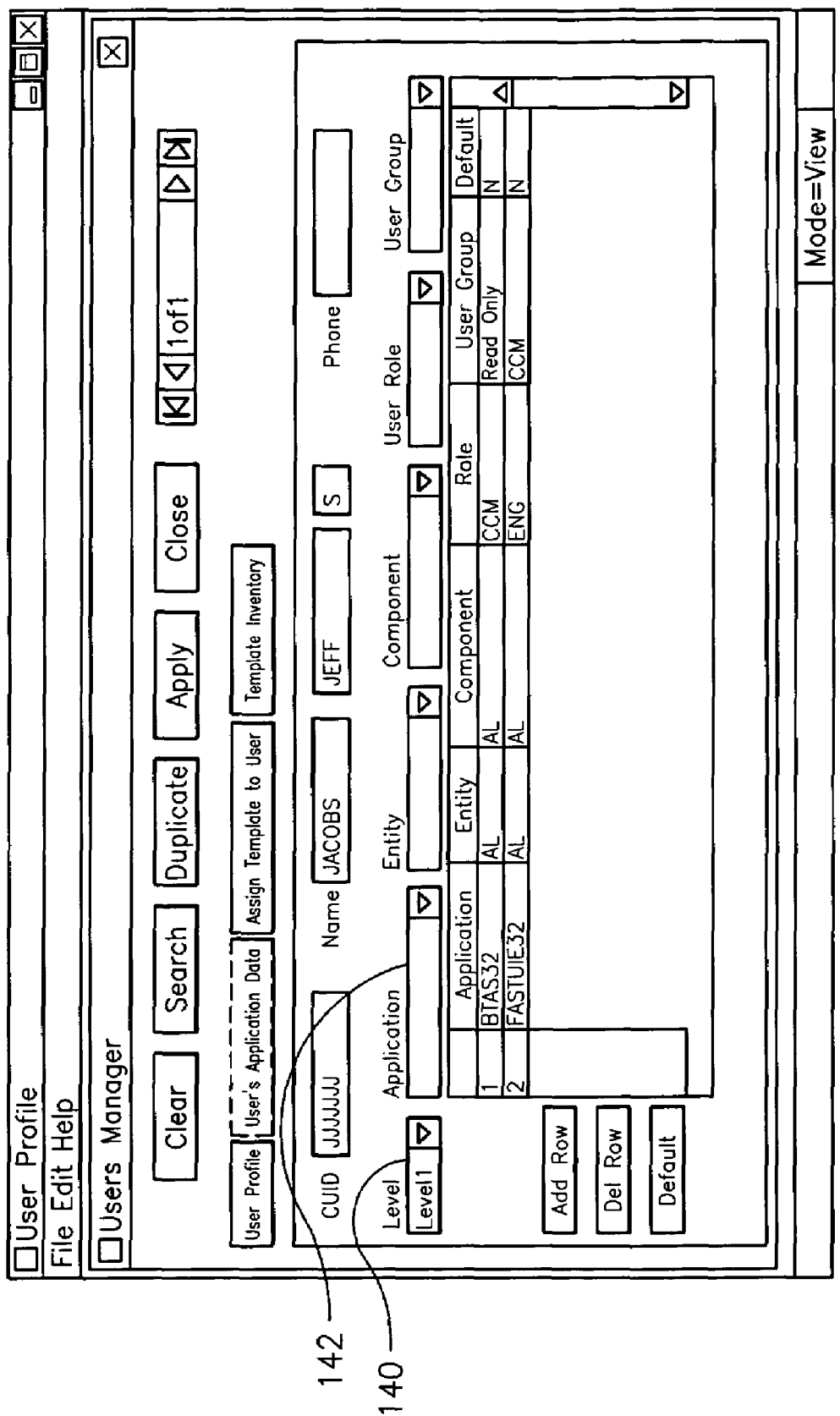

The administrator then assigns user authorization levels to the user as shown at step 116. FIG. 4 shows an exemplary user interface for entering user authorization levels. Through the interface in FIG. 4, the administrator can select an authorization level from an authorization level drop down menu 140 and an application from an application drop down menu 142. The user may be assigned a variety of authorization levels for each application. In an exemplary embodiment, three levels of access are used. Level 3 is the highest level of access to any application. Level 3 access to an application allows the assignment of level 2 or level 1 access to that application. Level 2 access to an application allows the assignment of level 1 access to that application. Level 1 access is at the user level, and is provided to users of the application(s). Level 1 access has no ability to assign access to other users.

Level 2 access also allows user level access, but in addition, provides the capability to assign level 1 access to other users. Level 2 access is given to one or two local people in each work group or district so that they can be responsible for adding/changing/deleting users in their own area. This provides more security since they personally know the people who need access and when someone retires, the Level 2 user know s that they have left, and they can remove that person's access. Level 3 access is the administrator level access for an application. Level 3 access also allows user level access, but in addition, provides the capability to assign level 2 (or level 1) access to other users. This enables the level 3 administrator to extend level 2 access to key users in each work group or dis access and permission levels in their own district.

An administrator has the ability to copy an existing user's access and permission level profile to a new user. As an example, assume that an existing user has access to ten different applications with varying degrees of access permission levels for each application. This user may have level 1 read only access in some applications, level 1 read-write capabilities in other applications, and level 2 read-write access in some applications. It would be tedious to totally build the new user's authorization levels from scratch on an application-by-application basis to in effect copy the outgoing user's exact authorization levels. The user interface of FIG. 3 includes a duplicate button 132 for copying the existing user's authorization levels to the new user.

Figure 5:
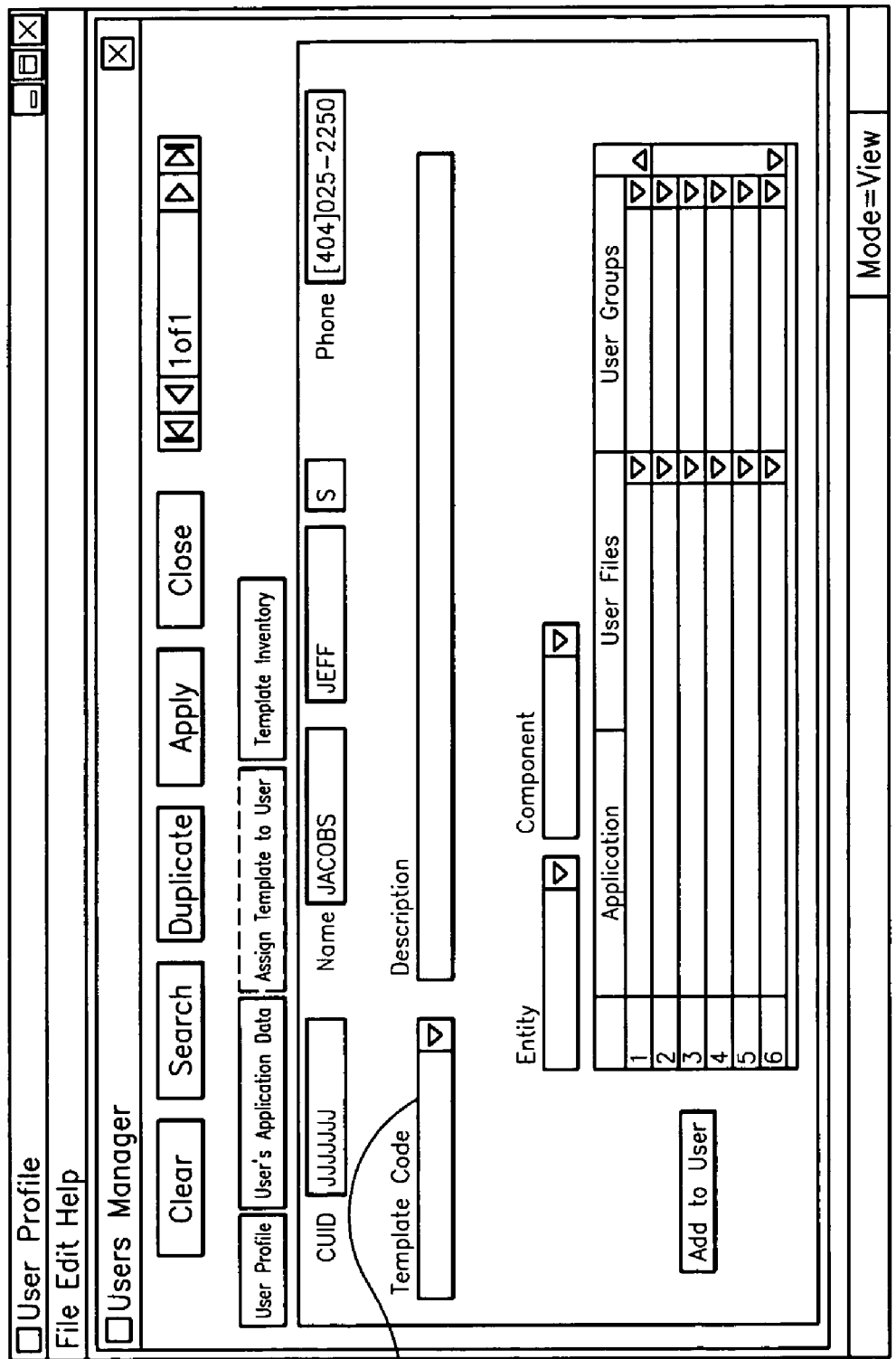

As an alternative to entering the user authorization levels through the interface in FIG. 4, a user authorization level template may be associated with a user through the interface shown in FIG. 5. The administrator can associate a user authorization level template with a user by selecting a template from a template drop down menu 144.

A set of defined templates are stored in database 24 that provide an administrator the ability to create or change user permissions for a single user and any combination of multiple applications based on the person's job title. FIG. 6 depicts an exemplary user authorization level template database which correlates job titles 150 with applications 152. For each application 152, the database indicates the authorization level for each lob title. For example, certain job titles are provided read only access while other job titles are provided read write access to the DSX/FOX application. This allows the administrator to select a user authorization level template based on the user's job title. This is much faster than setting up individual user authorization levels on an application-by-application basis.

The database shown in FIG. 6 associates user authorization levels with job titles. It is understood that the templates may be indexed using indicators other than job title. Other employment indicators may be used to distinguish between the types of users (company employee, contractor, application provider, etc.) and apply certain restrictions or permissions based on their user type. Company users can see proprietary information such as pricing and all supplier information, which could be considered proprietary. Contractor users can only see proprietary information for their own company. Application developer users have full permissions so that they can develop, maintain, and support the applications.

Figure 7:
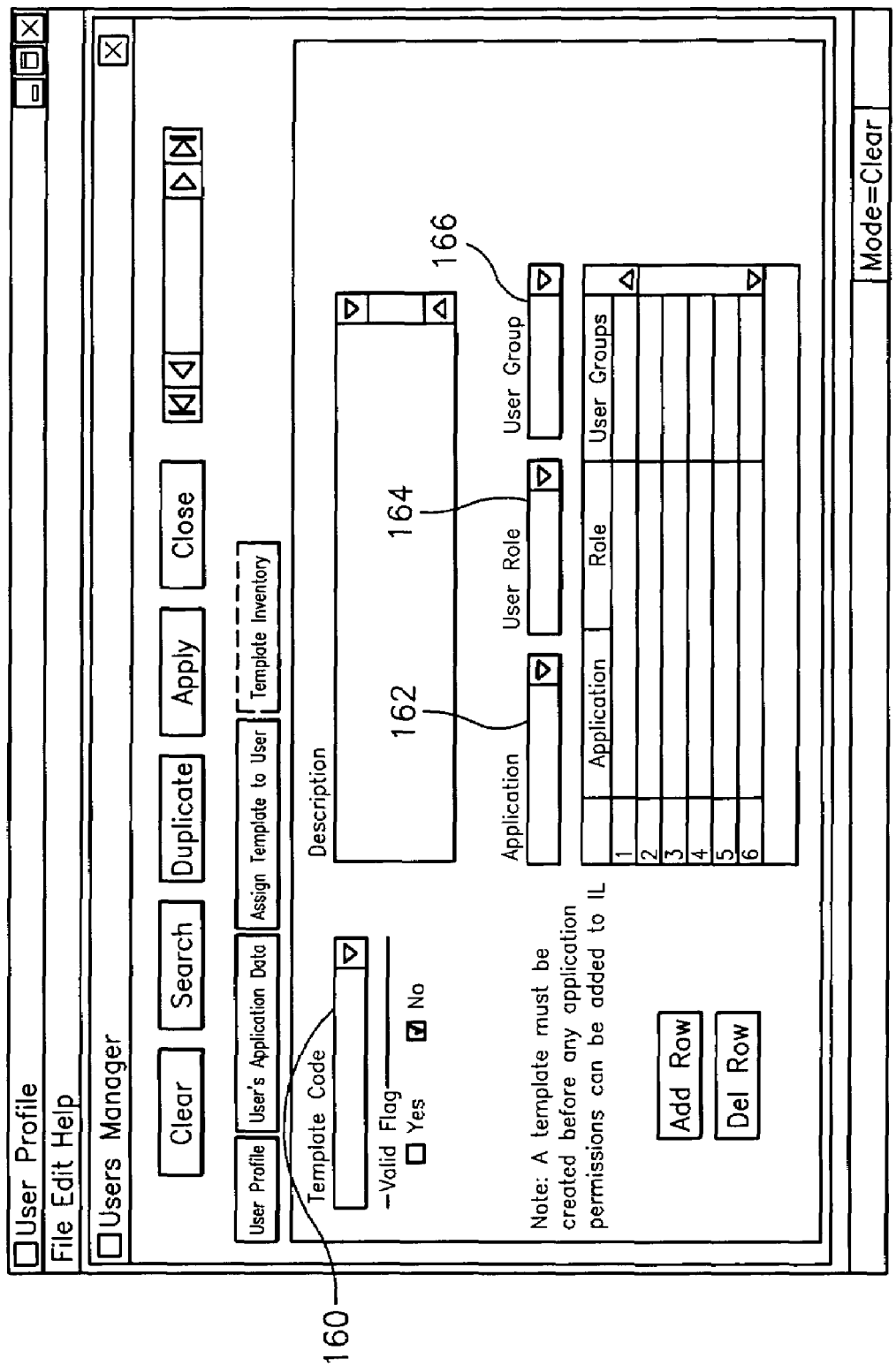
FIG. 7 depicts an exemplary user interface for managing user authorization level templates.

Templates may be created and edited through a template inventory interface shown in FIG. 7. As shown in FIG. 7, an administrator can create new templates or edit/delete existing templates to define user authorization levels across multiple applications. The administrator can enter a new template identifier through template identifier field 160. Applications may be selected from a drop down application menu 162 and user authorization levels are defined through drop down user role and user group menus 164 and 166. As described above, the user authorization level templates provide user authorization levels for a variety of software applications indexed by employment indicators (job title, internal employee, contractor, full-time, part-time, etc.).

Once the user authorization levels are established by manual entry, duplicating existing user authorization levels or assigning a user authorization level template to the user, the user authorization levels are stored on database 24 as shown at step 118 of FIG. 2.

Subsequently, when a user attempts to access an application on server 22, the user profile associated with that user is accessed from database 24 and the authorization level for that application determined. Server 22 then permits access to the application and controls the appropriate permission within the application in accordance with the user authorization level.

As described above, the present invention can be embodied in the form of computer-implemented processes and apparatuses for practicing those processes. In an exemplary embodiment, the invention is embodied in computer program code executed by the server. The present invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of managing user authorization levels for access to a plurality of applications, the method comprising:
   receiving a request from a user to establish a user profile,
   establishing an employment indicator for said user;
   retrieving a user authorization level template in response to said employment indicator, said user authorization level template identifying a plurality of applications and a user authorization level for each application;
   associating said user authorization levels with said user.

2. The method of claim 1 wherein:
   said employment indicator distinguishes an employee from a contractor.

3. The method of claim 1 wherein:
   said employment indicator is job title.

4. The method of claim 1 wherein:
   said user authorization levels indicate an access level for each of said applications.

5. The method of claim 4 wherein:
   said user authorization levels indicates a permission level for each of said applications.

6. The method of claim 1 wherein:
   said user authorization level includes administration level permitting or denying said user an ability assign an authorization level to said application to other users.

7. The method of claim 1 wherein:
   said user profile includes user personal information, said user personal information being retrieved from an auxiliary database.

8. The method of claim 7 wherein:
   said user personal information being retrieved from a human resources database.

9. A computer program for managing user authorization levels for access to a plurality of applications, the computer program including instructions for causing a computer to implement:
   receiving a request from a user to establish a user profile,
   obtaining an employment indicator for said user;
   retrieving a user authorization level template in response to said employment indicator, said user authorization level template identifying a plurality of applications and a user authorization level for each application;
   associating said user authorization levels with said user.

10. The computer program of claim 9 wherein:
    said employment indicator distinguishes an employee from a contractor.

11. The computer program of claim 9 wherein:
    said employment indicator is job title.

12. The computer program of claim 9 wherein:
    said user authorization levels indicate an access level for each of said applications.

13. The computer program of claim 12 wherein:
    said user authorization levels indicates a permission level for each of said applications.

14. The computer program of claim 9 wherein:
    said user authorization level includes administration level permitting or denying said user an ability assign an authorization level to said application to other users.

15. The computer program of claim 9 wherein:
    said user profile includes user personal information, said user personal information being retrieved from an auxiliary database.

16. The computer program of claim 15 wherein:
    said user personal information being retrieved from a human resources database.

17. A system for managing user authorization levels for access to a plurality of applications, the system comprising:
    a user system generating a request from a user to establish a user profile,
    an applications system coupled to said user system by a network; said applications system receiving said request and obtaining an employment indicator for said user;
    said applications system retrieving a user authorization level template in response to said employment indicator, said user authorization level template identifying a plurality of applications and a user authorization level for each application;
    said applications system associating said user authorization levels with said user.

18. The computer program of claim 17 wherein:
said employment indicator distinguishes an employee from a contractor.

19. The computer program of claim 17 wherein:
said employment indicator is job title.

20. The computer program of claim 17 wherein:
said user authorization levels indicate an access level for each of said applications.

21. The computer program of claim 20 wherein:
said user authorization levels indicates a permission level for each of said applications.

22. The computer program of claim 17 wherein:
said user authorization level includes administration level permitting or denying said user an ability assign an authorization level to said application to other users.

23. The computer program of claim 17 wherein:
said user profile includes user personal information, said user personal information being retrieved from an auxiliary database.

24. The computer program of claim 23 wherein:
said user personal information being retrieved from a human resources database.

* * * * *